(12) United States Patent
Kruglick (10) Patent No.: US 9,792,062 B2
(45) Date of Patent: Oct. 17, 2017

(54) ACCELERATION OF MEMORY ACCESS

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 153 days.

(21) Appl. No.: 14/348,143

(22) PCT Filed: May 10, 2013

(86) PCT No.: PCT/US2013/040588
§ 371 (c)(1),
(2) Date: Mar. 28, 2014

(87) PCT Pub. No.: WO2014/182314
PCT Pub. Date: Nov. 13, 2014

(65) Prior Publication Data
US 2015/0347051 A1   Dec. 3, 2015

(51) Int. Cl.
G06F 3/06 (2006.01)
G06F 9/455 (2006.01)
G06F 12/14 (2006.01)

(52) U.S. Cl.
CPC .......... G06F 3/0622 (2013.01); G06F 3/0637 (2013.01); G06F 3/0673 (2013.01);
(Continued)

(58) Field of Classification Search
None
See application file for complete search history.

(56) References Cited

U.S. PATENT DOCUMENTS 4,757,438 A     7/1988   Thatte et al.
7,373,432 B2 *  5/2008   Rapp ............... G06Q 40/08
                                                      710/8
(Continued)

FOREIGN PATENT DOCUMENTS

WO    2004042569 A2    5/2004
WO    2012121736 A1    9/2012

OTHER PUBLICATIONS

Microcode. (2010). In S. Collin (Ed.), Dictionary of computing.*
(Continued)

*Primary Examiner* — Brian Peugh
*Assistant Examiner* — Dustin Bone
(74) *Attorney, Agent, or Firm* — Moritt Hock & Hamroff LLP; Steven S. Rubin, Esq.

(57) ABSTRACT

Technologies are generally described for systems, devices and methods effective to accelerate memory access. A memory unit, including a memory and a programmable circuit, may be in communication with a processor executing a virtual machine. The memory unit may receive from the processor, a request to configure the programmable circuit in accordance with a program. The program may be associated with the virtual machine. The programmable circuit may be configured in accordance with the program. The programmable circuit may then be operated to perform one or more operations on data in the memory.

27 Claims, 8 Drawing Sheets (52) U.S. Cl.
CPC ...... *G06F 9/45558* (2013.01); *G06F 12/1458* (2013.01); *G06F 2009/45583* (2013.01); *Y02B 60/1225* (2013.01)

(56) References Cited

U.S. PATENT DOCUMENTS

| | | | |
|---|---|---|---|
| 2003/0158842 | A1 | 8/2003 | Levy et al. |
| 2004/0170070 | A1* | 9/2004 | Rapp ..................... G06Q 40/08 365/200 |
| 2005/0125580 | A1* | 6/2005 | Madukkarumukumana G06F 9/4812 710/200 |
| 2007/0150671 | A1 | 6/2007 | Kurland |
| 2007/0168676 | A1* | 7/2007 | Fayad ..................... G06F 21/72 713/185 |
| 2009/0327667 | A1* | 12/2009 | Krithivasan .............. G06F 7/48 712/225 |
| 2010/0229043 | A1 | 9/2010 | Saha et al. |
| 2011/0145591 | A1* | 6/2011 | Grzybowski ......... G06F 9/4451 713/189 |
| 2012/0233610 | A1* | 9/2012 | Mandre ............... G06F 9/45558 718/1 |
| 2013/0081013 | A1 | 3/2013 | Plondke et al. |
| 2016/0077852 | A1* | 3/2016 | Kissell ................ G06F 9/45516 712/209 |

OTHER PUBLICATIONS

M. Teresa Higuera-Toledano, Distributed, Embedded and Real-time Java Systems, 2012, Springer, pp. 181-182.*
"ABAX 3PLD Product Family Overview," accessed at http://web.archive.org/web/20120705025430/http://www.tabula.com/products/overview.php, accessed on Jan. 30, 2014, pp. 1-2.
"Memory Interface Generator (MIG)," accessed at http://web.archive.org/web/20130507085954/http://www.xilinx.com/products/intellectual-property/MIG.htm, accessed on Jan. 30, 2014, pp. 1-2.
Andrews, D., et al., "Programming models for hybrid FPGA-CPU computational components: a missing link," Micro, IEEE, 2004, pp. 42-53,vol. 24, Issue 4.
Burger, T.W., "Intel® Virtualization Technology for Directed I/O (VT-d): Enhancing Intel platforms for efficient virtualization of I/O devices," accessed at http://web.archive.org/web/20130308015639/http://software.intel.com/en-us/articles/intel-virtualization-technology-for-directed-io-vt-d-enhancing-intel-platforms-for-efficient-virtualization-of-io-devices!, Mar. 5, 2012, pp. 1-8.
Chung, E.S., "Prototype and Evaluation of the CoRAM Memory Architecture for FPGA-Based Computing," Proceedings of the ACM/SIGDA international symposium on Field Programmable Gate Arrays, 2012, pp. 139-142.
Grupp, L.M., et al., "The Bleak Future of NAND Flash Memory," Proceedings of the 10th USENIX conference on File and Storage Technologies, 2012, pp. 8.
Hamburger, E., "Sandbox of frustration: Apple's walled garden closes in on Mac developers," accessed at http://web.archive.org/web/20130306041531/http://www.theverge.com/2012/7/27/3186875/mac-app-store-sandboxing-frustration-mountain-lion, Jul. 27, 2012, pp. 1-4.
Knauerhase, R., et al., "For Extreme Parallelism, Your OS Is Sooooo Last-millennium," In Proceedings of the 4th USENIX Conference on Hot Topics in Parallelism, 2012, pp. 8.
Kodavalla, V.K., and Sing, D.B., "FPGA Prototyping of Complex SoCs: RTL code migration and debug strategies," accessed at http://www.design-reuse.com/articles/15999/fpga-prototyping-of-complex-socs-rtl-code-migration-and-debug-strategies.html, accessed on Sep. 24, 2012, pp. 1-3.
Miller, M.J., "Bandwidth Engine® Serial Memory Chip Breaks 2 Billion Accesses/sec," In Proceedings of the 23rd Hot Chips Symposium, 2011, pp. 1-23.
Saito, H., et al., "A Chip-Stacked Memory for On-Chip SRAM-Rich SoCs and Processors," Journal of Solid-State Circuits, 2010, pp. 15-23, vol. 45, Issue 1.
Sampson, J., et al., "Efficient Complex Operators for Irregular Codes," IEEE 17th International Symposium on High Performance Computer Architecture (HPCA), 2011, pp. 491-502.
Shimpi, A.L., "Intel Haswell Architecture Disclosure: Live Blog," accessed at http://web.archive.org/web/20130508064335/http://www.anandtech.com/show/6263/intel-haswell-architecture-disclosure-live-blog, Sep. 11, 2012, pp. 1-12.
Shiratsuchi, S. "FPGA as a Key Component for Reconfigurable System," Evolvable Systems: From Biology to Hardware, 1997, pp. 23-32, vol. 1259.
Simonite, T., "Reprogrammable Chips Could Enable Instant Gadget Upgrades," MIT technology Review, accessed at http://www.technologyreview.com/news/423662/reprogrammable-chips-could-enable-instant-gadget-upgrades/, Apr. 15, 2011, pp. 1-1.
Swanson, S., and Taylor, M.B., "Greendroid: Exploring the next evolution in smart phone application processors," Communications Magazine, 2011, pp. 112-119, vol. 49, Issue 4.
Torres, L., et al., "A Dynamic Reconfigurable Mram Based Fpga," In International Conference on Engineering of Reconfigurable Systems and Algorithms (ERSA 2010), 2010, pp. 31-40. [Abstract and partial copy].
Tulbure, T., "A Dynamic Reconfigurable CPLD Architecture for Structured ASIC Technology," Reconfigurable Computing: Architectures, Tools and Applications, 2011, pp. 296-301, vol. 6578.
International Search Report with Written Opinion for International Application No. PCT/US2013/040588 mailed on Dec. 2, 2013, 21 pages.
International Technology Road map for Semiconductors, System Drivers, accessed at http://www.itrs.net/Links/2011ITRS/2011Chapters/2011SysDrivers.pdf, 2011, 31 pages.
Miller, M., HC23-S3: Memory & FPGA, accessed at https://www.youtube.com/watch?v=QOYE56OCE3o, Apr. 2, 2012, 2 pages.
Pawlowski, J. Thomas, HC23-S3: Hybrid Memory Cube (HMC), Micron Technology, Inc., Aug. 4, 2011, 24 pages.

* cited by examiner

ACCELERATION OF MEMORY ACCESS

CROSS-REFERENCE TO RELATED APPLICATION

This application is a U.S. National stage filing under 35 U.S.C. §371 of International Application No. PCT/US2013/040588, filed on May 10, 20131. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

A memory may store information that may be used by a processor. The processor may store the information, delete the information and/or modify the information stored in the memory. The memory may be disposed on the same die or on a die separate from the processor. A memory unit including a memory may include one or more macros to perform operations on the memory. The one or more macros may perform operations on memory faster than memory operations executed by a processor.

SUMMARY

In one example, methods for a memory unit that includes a memory and a programmable circuit are generally described. The memory unit may be configured in communication with a virtual machine executed by a processor. The methods for the memory unit may include receiving, from the processor, a request to configure the programmable circuit in accordance with a program. The program may be associated with the virtual machine being executed by the processor. The methods may further include configuring the programmable circuit in accordance with the first program. The methods may further include operating the programmable circuit to perform one or more operations on data in the memory in accordance with the program.

In one example, memory units are generally described. The memory units may include a memory and a programmable circuit. The memory units may be effective to receive, from a processor, a request to configure the programmable circuit in accordance with a program. The program may be associated with a virtual machine being executed by the processor. The memory unit may be further effective to configure the programmable circuit in accordance with the program. The programmable circuit may be effective to perform one or more operations on data in the memory in accordance with the program.

In one example, methods for a memory unit that includes a memory and a programmable circuit are generally described. The memory unit may be configured in communication with two or more virtual machines executable by a processor. The methods for the memory unit may include receiving, from a first virtual machine executed by the processor, a first request to configure the programmable circuit in accordance with a first program. The first program may be associated with the first virtual machine. The methods may further include configuring the programmable circuit in accordance with the first program. The methods may further include operating the programmable circuit to perform a first set of one or more operations on data in the memory in accordance with the first program. The methods may further include receiving, from a second virtual machine executed by the processor, a second request to configure the programmable circuit in accordance with a second program. The second program may be associated with the second virtual machine. The methods may further include configuring the programmable circuit in accordance with the second program. The methods may further include operating the programmable circuit to perform a second set of one or more operations on data in the memory in accordance with the second program.

In one example, computer program products are generally described. The computer program products may include computer-readable instructions stored in non-transitory computer-readable media. The computer-readable instructions may be operable in response to execution by a processor, to detect, from the processor, a request to configure the programmable circuit in accordance with a program. The program may be associated with the virtual machine being executed by the processor. The computer-readable instructions may be operable to configure the programmable circuit in accordance with the program. The computer-readable instructions may be operable operate the programmable circuit to perform one or more operations on data in the memory in accordance with the program.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to acceleration of memory access.

Briefly stated, technologies are generally described for systems, devices and methods effective to accelerate memory access. A memory unit, including a memory and a programmable circuit, may be in communication with a processor executing a virtual machine. The memory unit may receive from the processor, a request to configure the programmable circuit in accordance with a program. The program may be associated with the virtual machine. The programmable circuit may be configured to operate in accordance with the program. The programmable circuit may then be operated to perform one or more operations on data in the memory in accordance with the program.

Figure 1:
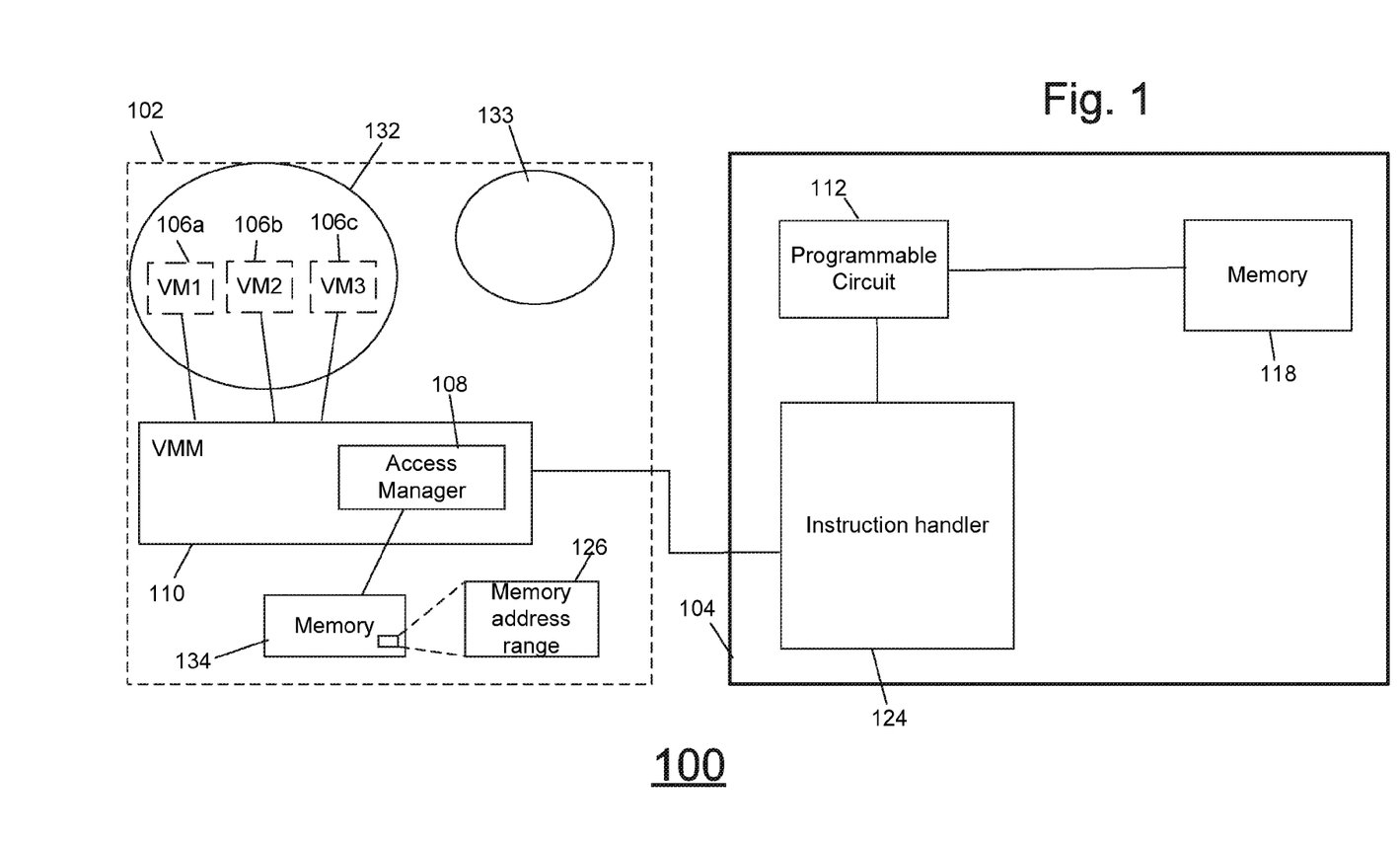
FIG. 1 illustrates an example system that can be utilized to implement acceleration of memory access.

FIG. 1 illustrates an example system that can be utilized to implement acceleration of memory access in accordance with at least some embodiments described herein. An example system 100 may include a processor space 102 and/or a memory unit 104 configured to be in communication with one another. Processor space 102 may include one or more processor cores 132, 133, one or more virtual machine managers (VMM) 110, and/or a processor memory 134 configured to be in communication with each other. Processor cores 132, 133 may be located within one or more processors. Processor core 132 may execute one or more virtual machines (VM) 106 (including VM1 106a, VM2 106b, and VM3 106c). A virtual machine may be, for example, a software program that emulates a physical computer. Virtual machines may be based on specifications of a hypothetical computer or emulate computer architecture and functions of a physical computer. Virtual machines 106 may execute one or more programs. Virtual machines 106 may be created or controlled by virtual machine manager 110. Virtual machine manager 110 may be, for example, hardware, software, or some combination of hardware and software and may be used to create and/or control virtual machines 106. Memory unit 104 may include memory 118, a programmable circuit 112, and/or an instruction handler 124. Instruction handler 124 may be in memory unit 104.

Virtual machine manager 110 may include one or more access managers 108. Access manager 108 may be, for example, hardware, software or some combination of hardware and software. Access manager 108 may be configured to send information to memory 118 in memory unit 104. In some examples, access manager 108 may be configured to send affinity information to memory unit 104. In some examples, affinity information may include an identifier of a currently executing virtual machine 106 (for example, VM1 106a, VM2 106b, or VM3 106c) to memory unit 104. In some examples, access manager 108 may be configured to send an indicator of memory address range 126 that is permissible for access by a particular virtual machine 106 (for example, VM1 106a, VM2 106b, or VM3 106c) to memory unit 104. One or more memory address ranges 126 may be stored in processor memory 134. In some examples, memory address range 126 may include one or more memory addresses that are permissible to be accessed by a particular virtual machine 106. In other examples, memory address range 126 may include one or more memory addresses that are not permissible to be accessed by a particular virtual machine 106.

In an example, memory unit 104 may be implemented as a hybrid memory cube (HMC) or other type of memory. Programmable circuit 112 may be a circuit that can be configured to operate in accordance with one or more programs. A program for programmable circuit 112 may be one or more instructions to perform a set of one or more operations on data stored in memory 118. As explained in more detail below, programmable circuit 112 may be configured to operate in accordance with a program associated with a virtual machine being executed by processor 132.

In some examples, programmable circuit 112 could be a field-programmable gate array (FPGA), a semi-programmable application-specific integrated circuit (ASIC), digital signal processor, EEPROM (electrically erasable programmable read only memory), SRAM (static random access memory) erasable programmable device, or another programmable circuit. Operations performed on data stored in memory 118 may include, for example, increment/decrement (which may be an operation to increase or decrease a value stored in memory 118), data lookup (which may be an operation to match a value with data stored in memory 118), pointer indirection (relating to memory address pointers), data packing/unpacking (involving compression or decompression of data), vector norms (normalizing or statistically summarizing data), find by content (returning an item by value instead of address), k-means finding (grouping together data based on values), and/or other operations.

As explained in more detail below, instruction handler 124 may be configured to receive affinity information from access manager 108. Affinity information may include information that associates a particular virtual machine 106 (for example, VM1 106a, VM2 106b, or VM3 106c) with one or more programs. Instruction handler 124 may identify the particular virtual machine 106 and programs available for the particular virtual machine. Different virtual machines 106 (including VM1 106a, VM2 106b, and VM3 106c, for example) may generate one or more memory requests to access memory 118. The one or more memory requests may each contain one or more instructions to configure programmable circuit 112. The one or more instructions may be associated with the particular virtual machine generating the memory request. In response to the memory requests, access manager 108 may send the one or more instructions to instruction handler 124. Instruction handler 124 may configure programmable circuit 112 in accordance with the one or more instructions.

Figure 2:
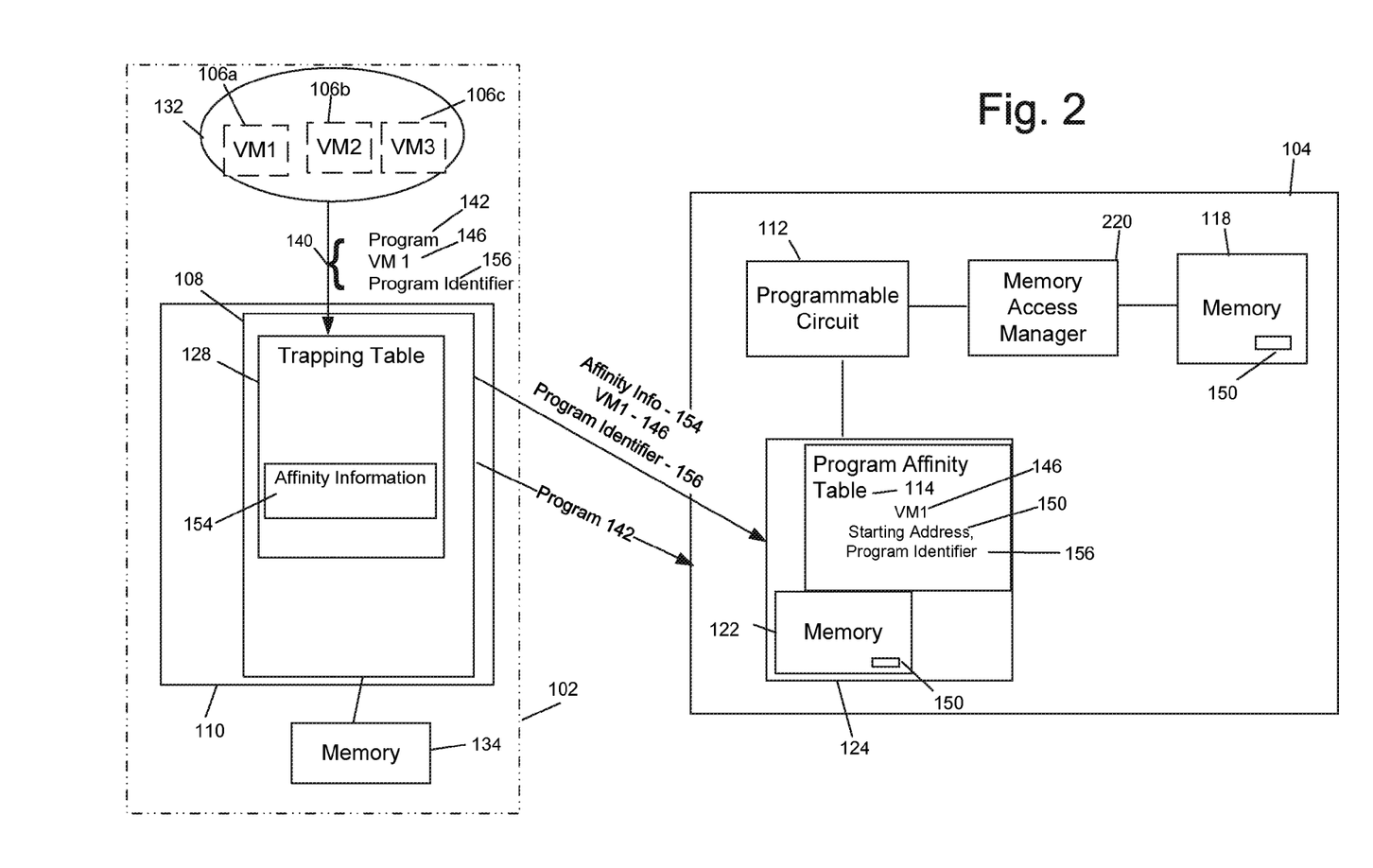
FIG. 2 depicts the example system that can be utilized to implement acceleration of memory access of FIG. 1, illustrating an example where a program is delivered.

FIG. 2 illustrates an example system that can be utilized to implement acceleration of memory access of FIG. 1 illustrating an example where a program is delivered. Those components in FIG. 2 that are labeled identically to components of FIG. 1 will not be described again for the purposes of clarity and brevity.

A memory access manager 220 may be configured to control access to memory 118 by programmable circuit 112.

Memory access manager 220 may be hardware, software, or a combination of hardware and software. In an example, memory access manager 220 may allow programmable circuit 112 to perform the one or more operations on data stored at a first address of memory 118, where the first address of memory 118 is within memory address range 126. Conversely, memory access manager 220 may restrict programmable circuit 112 from performing the one or more operations on data stored at a second address of memory 118, where the second address of memory 118 is not within memory address range 126.

A particular virtual machine 106 may generate a request to access memory unit 104. In some examples, a particular VM 106 may request direct access to data in memory 118 of memory unit 104. In other examples, a particular VM 106 may request access to data in memory 118 of memory unit 104 through programmable circuit 112. In examples where memory access through programmable circuit 112 is requested, the request may specify a program 142 for programmable circuit 112.

Access manager 108 may include a trapping table 128. In some examples, trapping table 128 may be a data structure stored in access manager 108. In other examples, trapping table 128 may be a data structure stored in processor memory 134. Trapping table 128 may store specified request types and an associated action for each respective request type. For example, the request types may indicate certain protected requests. Protected requests may have one or more associated memory address ranges 126. Access manager 108 may send the protected request and an indicator of one or more associated memory address ranges 126 to memory unit 104.

In an example, virtual machine 106a may generate a request 140 to deliver one or more programs to memory unit 104. A request 140 to deliver one or more programs may be a protected request. In some examples, request 140 may include a program 142 and virtual machine identifier 146. In other examples, request 140 may include a program identifier 156 and virtual machine identifier 146. Virtual machine identifier 146 may be, for example, a tag identifying a particular virtual machine (e.g. "VM1" or "VM2"). Program 142 may be one or more instructions that may be used to configure programmable circuit 112 to perform one or more operations on data stored in memory 118. Program identifier 156 may be a tag effective to identify program 142 from among other available programs associated with virtual machines 106. For example, program identifier 156 may identify the program itself or may be configured to identify the program upon analysis of a lookup table.

Access manager 108 may intercept request 140 in examples when request 140 is a protected request. Access manager 108 may compare request 140 with requests identified in trapping table 128 to determine whether request 140 is a protected request. In the example shown in FIG. 2, request 140 is a request to deliver program 142 to memory unit 104. A request to deliver may be a protected request. Access manager 108 may identify request 140 as corresponding to a protected request. Another example of a protected request may be a request to activate a program as is explained below. In examples when request 140 is a protected request, access manager 108 may perform an additional action. In examples where request 140 is a request to deliver, access manager 108 may generate affinity information 154 ("affinity info"). Affinity information 154 may include information that associates program 142 with program identifier 156 and/or with virtual machine identifier 146. Access manager 108 may then send affinity information 154 to instruction handler 124. Access manager 108 may also send program identifier 156 and virtual machine identifier 146 to instruction handler 124. Access manager 108 may also send program 142 to memory unit 104.

Instruction handler 124 may receive affinity information 154, virtual machine identifier 146, program identifier 156 and program 142. Processor 116 may store program 142 in memory 118, in instruction handler memory 122, or in programmable circuit 112 at a starting address 150. Starting address 150 may then be stored in program affinity table 114. Processor 116 may then store virtual machine identifier 146, affinity information 154, and program identifier 156 in program affinity table 114. Virtual machine identifier 146, affinity information 154, and program identifier 156 may be associated with starting address 150 in program affinity table 114.

Figure 3:
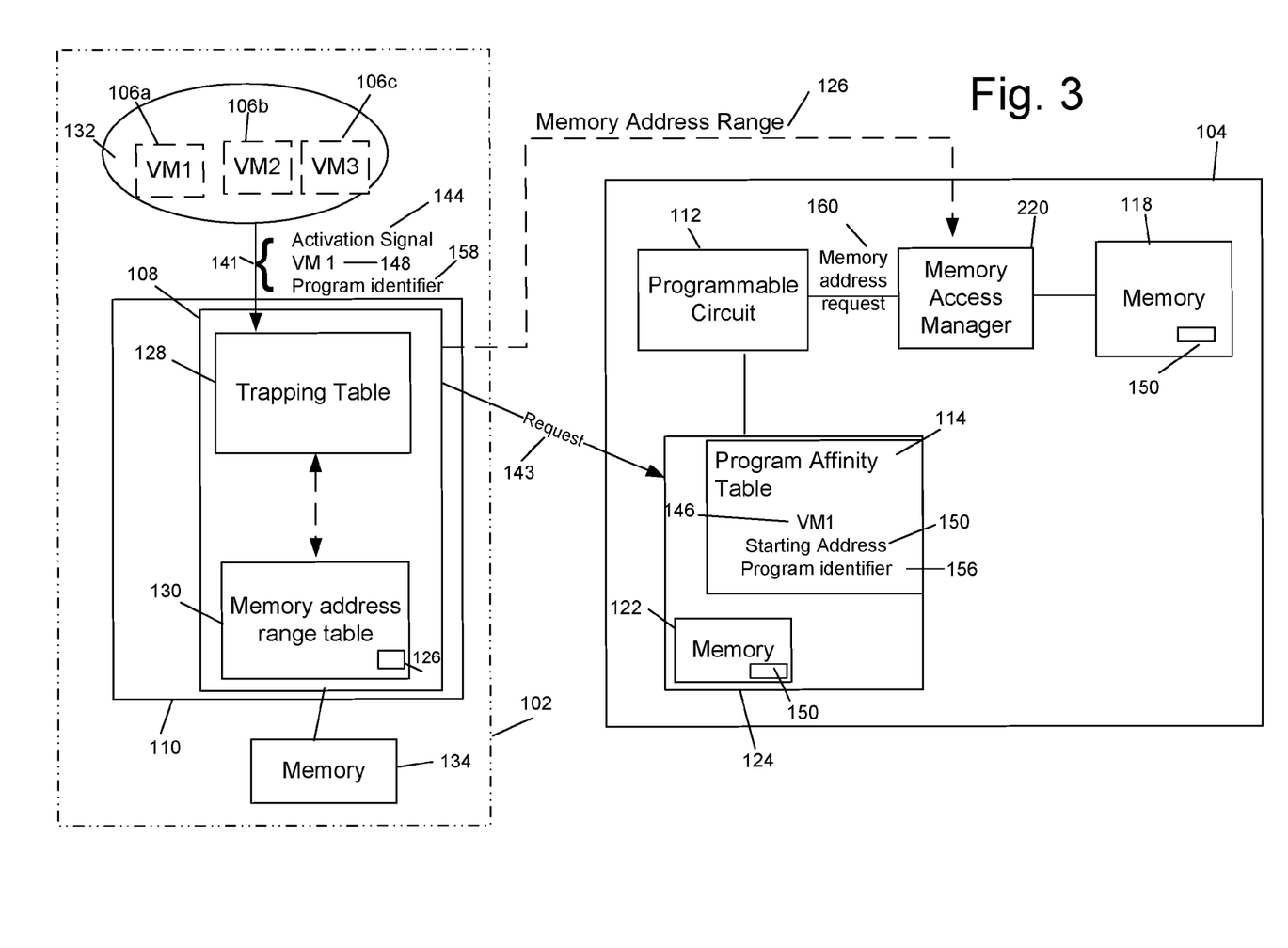
FIG. 3 depicts an example system that can be utilized to implement acceleration of memory access of FIG. 1, illustrating an example where a program is activated.

FIG. 3 illustrates an example system that can be utilized to implement acceleration of memory access of FIG. 1 illustrating an example where a program is activated arranged in accordance with at least some embodiments described herein. Those components in FIG. 3 that are labeled identically to components of FIGS. 1 and 2 will not be described again for the purposes of clarity and brevity.

Access manager 108 may include a memory address range table 130. Memory address range table 130 may be, for example, a table identifying memory address ranges 126 permissible to be accessed by respective virtual machines 106 (including virtual machines 106a, 106b, and 106c). Memory address range table 130 may be a data structure stored within access manager 108. In another example, memory address range table 130 may be stored within processor memory 134. In an example, access manager 108 may use virtual machine identifier 148 to analyze memory address range table 130. In the example, access manager 108 may determine that virtual machine 106a may access memory between a starting address "AAA" and an ending address "XXX" based on analysis of memory address range table 130. Access manager 108 may then determine that virtual machine 106a is permitted to access a memory address range 126 that begins at memory address start "AAA" and ends at memory address end "XXX." In an example, virtual machine 106a may generate a request 141 to activate a program in memory unit 104. In examples where a virtual machine 106 requests access to a memory range outside of permissible memory address range 126, access manager 108 may restrict access to the requested memory range such as by restricting access to memory unit 104.

Request 141 to activate may include an activation signal 144 and virtual machine identifier 148 (e.g. "VM1" or "VM2"). In examples where virtual machines may access two or more programs, request 141 may also include a program identifier 158. Activation signal 144 may be a signal configured to activate one or more programs stored at starting address 150 in memory 118 or instruction handler memory 122. The one or more programs stored in memory 118 or instruction handler memory 122 may be used to configure programmable circuit 112, so that programmable circuit 112 may perform one or more operations on data stored in memory 118. Program identifier 158 may be a tag effective to identify a particular program associated with requesting virtual machine 106a.

Access manager 108 may compare request 141 with requests identified in trapping table 128 to determine whether request 141 is a protected request. In the example shown in FIG. 3, request 141 is a request to activate a program stored in memory unit 104. A request to activate may be a protected request. Access manager 108 may identify request 141 as corresponding to a protected request. Access manager 108 may analyze memory address range table 130 to determine memory address range 126 permissible to be accessed by virtual machine 106a. If access manager 108 identifies request 141 as corresponding to a protected request, access manager 108 may forward a processed request 143 and send an indicator of memory address range 126 to memory access manager 220.

In examples where request 141 includes a request to access memory outside memory address range 126, access manager 108 may restrict access to the memory range such as by restricting access to memory unit 104. In examples where request 141 includes a request to access memory within memory address range 126, access manager 108 may send an indicator of memory address range 126 for virtual machine 106a to memory access manager 220 of memory unit 104. In examples where request 141 is a "lookup" request, such as a request that does not specify a memory address, access manager 108 may send an indicator of memory address range 126 for virtual machine 106a to memory access manager 220 of memory unit 104. Access manager 108 may then send processed request 143, including activation signal 144, virtual machine identifier 148 and program identifier 158, to instruction handler 124.

In one example, instruction handler 124 may receive activation signal 144 and virtual machine identifier 148. Instruction handler 124 may then analyze program affinity table 114 for stored virtual machine identifier 146—discussed above. Instruction handler 124 may then, based on the comparison, determine starting address 150 that corresponds to virtual machine identifier 148. Starting address 150 may identify where a program may be stored in memory unit 104 (e.g. "Address XXX", "Address YYY"). For example, starting address 150 may indicate that program "AA" for virtual machine VM2 (160b) is stored in memory starting at an address "YYY."

In another example, instruction handler 124 may receive activation signal 144, virtual machine identifier 148 and program identifier 158. Instruction handler 124 may then analyze program affinity table 114 for stored virtual machine identifier 146 and program identifier 156—discussed above. Instruction handler 124 may then, based on the comparison, determine starting address 150 that corresponds to virtual machine identifier 148 and/or program identifier 158. Starting address 150 may identify where a program that corresponds to a program identifier may be stored in memory unit 104 (e.g. "Address XXX", "Address YYY"). For example, starting address 150 may indicate that program "AA" for virtual machine VM2 (160b) is stored in memory starting at an address "YYY." Instruction handler 124 may configure programmable circuit 112 using the program stored at starting address 150 to perform one or more operations on data stored in memory 118 based on the program stored at starting address 150. Memory access manager 220 may receive an indicator of memory address range 126. As is explained below, memory access manager 220 may control access to memory 118 by programmable circuit 112. For example, memory access manager 220 may permit programmable circuit 112 to operate on addresses within permissible memory address range 126 and restrict programmable circuit 112 from operating on addresses outside permissible memory address range 126.

In an example, programmable circuit 112 may attempt to perform one or more operations on data stored at one or more memory addresses of memory 118. Programmable circuit 112 may send a memory address request 160 to memory access manager 220. Memory access manager 220 may determine a memory address requested by programmable circuit 112 in memory address request 160. Memory access manager 220 may allow programmable circuit 112 to perform the one or more operations on data stored at a first address of memory 118, where the first address of memory 118 is within memory address range 126. Conversely, memory access manager 220 may restrict or prevent programmable circuit 112 from performing the one or more operations on data stored at a second address of memory 118, where the second address of memory 118 is outside of memory address range 126.

Figure 4:
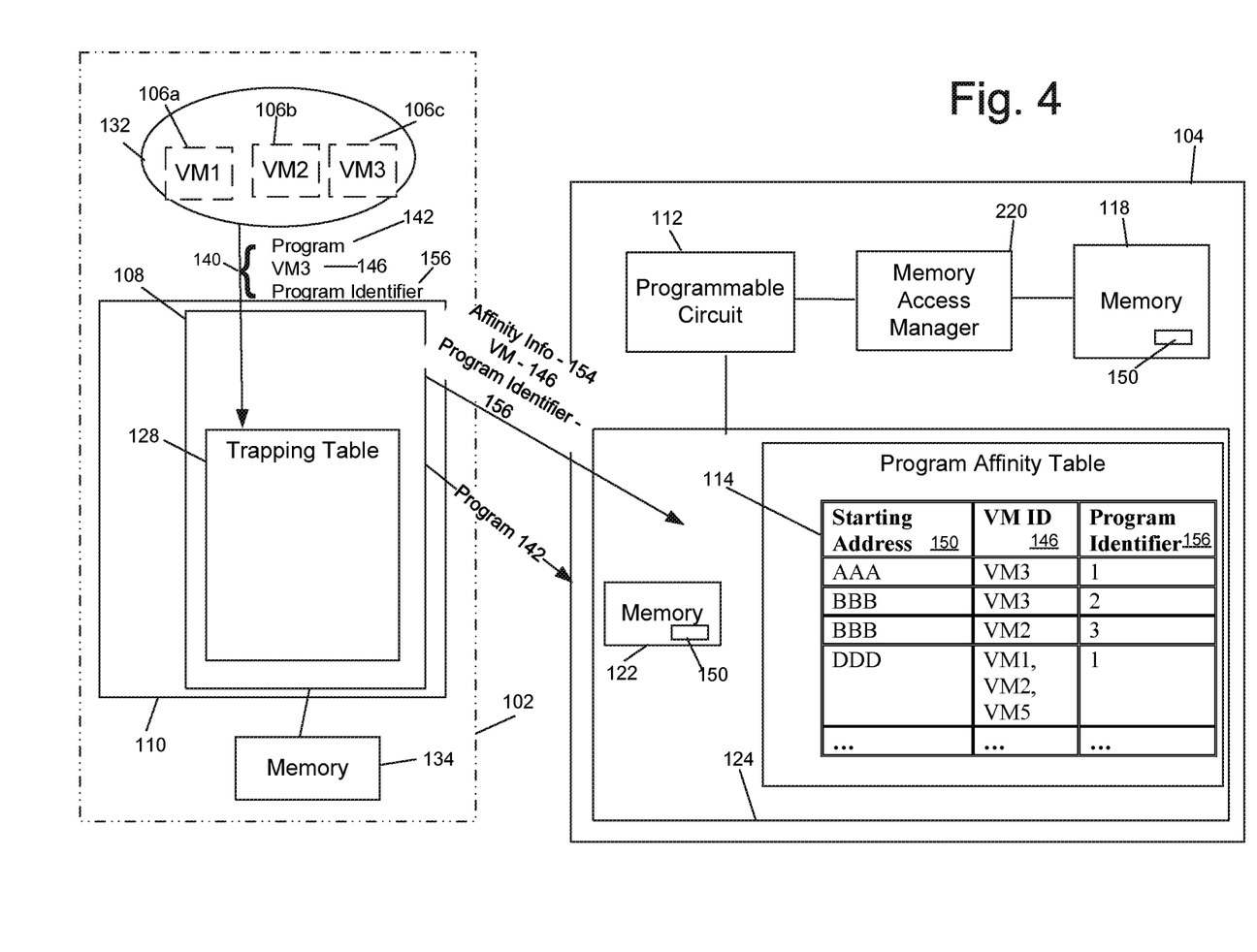
FIG. 4 illustrates an example system that can be utilized to implement acceleration of memory access including an example delivery request.

FIG. 4 illustrates an example system that can be utilized to implement acceleration of memory access including an example delivery request arranged in accordance with at least some embodiments described herein. Those components in FIG. 4 that are labeled identically to components of FIGS. 1, 2 and 3 will not be described again for the purposes of clarity and brevity.

In an example, virtual machine 106c may generate a request 140 to deliver a program to memory unit 104. Request 140 may include a program 142, a program identifier 156, and virtual machine identifier 146.

Access manager 108 may identify request 140 as being a protected request and may generate affinity information 154. Access manager 108 may then send affinity information 154 ("affinity info") to instruction handler 124. Access manager 108 may also send program identifier 156 and virtual machine identifier 146 ("VM") to instruction handler 124. Affinity information 154 may include information that associates program 142 with program identifier 156 and/or with virtual machine identifier 146. In some examples, access manager 108 may also send program 142 to memory unit 104.

Instruction handler 124 may receive affinity information 154, virtual machine identifier 146, program identifier 156 and program 142. Instruction handler 124 may store program 142 in memory 118 or instruction handler memory 122 at a starting address 150. Starting address 150 may be stored in program affinity table 114. Instruction handler 124 may then store virtual machine identifier 146, affinity information 154, program identifier 156 and starting address 150 in program affinity table 114.

In an example, with reference to program affinity table 114 (first row), virtual machine identifier 146 of virtual machine 106c may be "VM3." Request 140 may include a program identifier 156 of "1." Program 142 may be a macro or other program used to configure programmable circuit 112 to increment a counter. Program 142 may be stored at a starting address 150 of "AAA."

In another example, with reference to program affinity table 114 (second row), virtual machine identifier 146 of virtual machine 106c may be "VM3." Program 142 may have a program identifier 156 of "2." Program 142 may be a macro or other program used to configure programmable circuit 112 to decrement a counter (in memory 118). Program 142 may be stored at a starting address 150 of "BBB."

Figure 5:
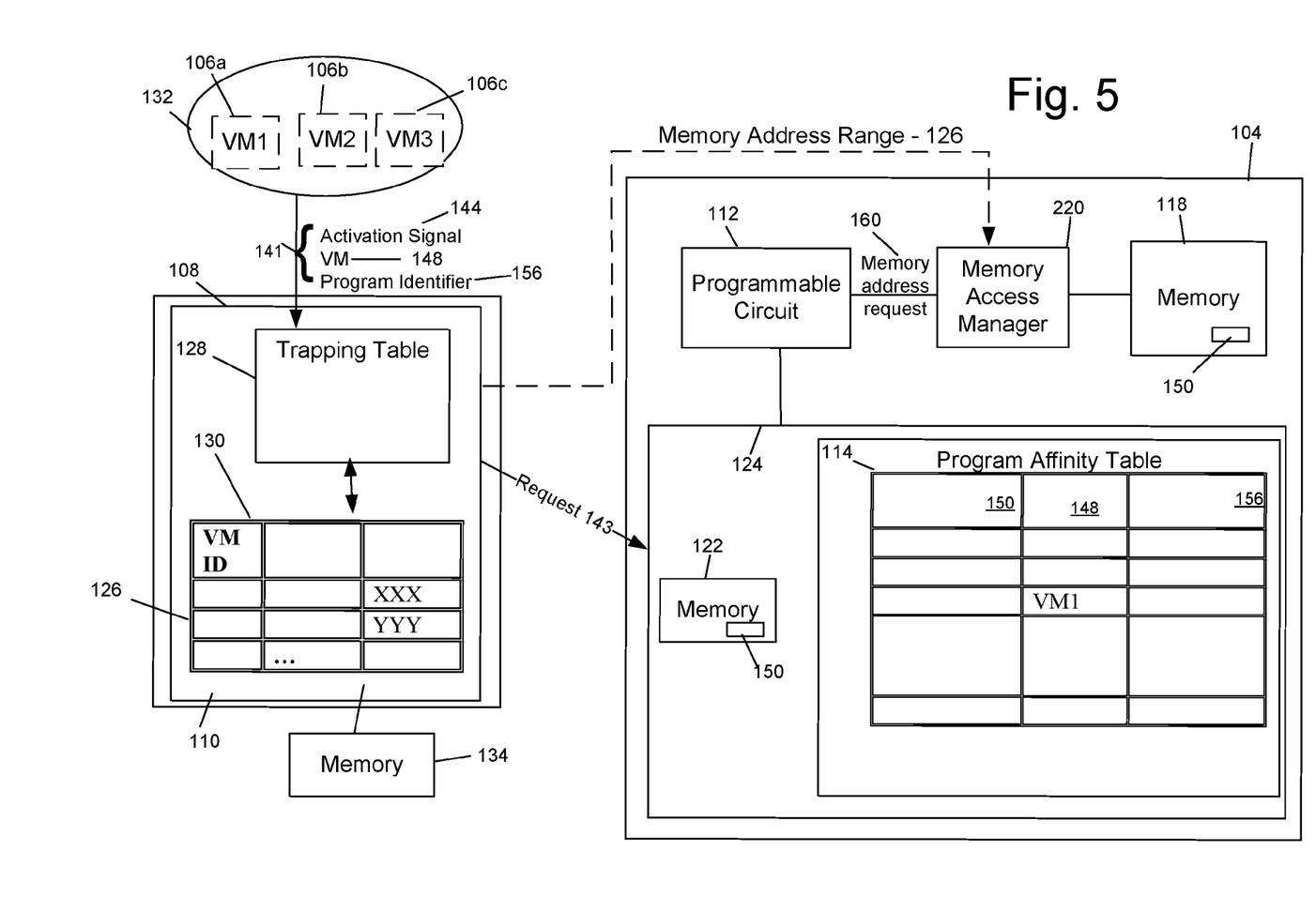
FIG. 5 illustrates an example system that can be utilized to implement acceleration of memory access including an example activation request.

FIG. 5 illustrates an example system that can be utilized to implement acceleration of memory access including an example activation request arranged in accordance with at least some embodiments described herein. Those components in FIG. 4 that are labeled identically to components of FIGS. 1, 2, 3 and 4 will not be described again for the purposes of clarity and brevity.

In an example, with reference to FIG. 5, virtual machine 106c may generate a request 141 to activate a program stored in memory unit 104. In the example, virtual machine identifier 148 of virtual machine 106*c* may be "VM3." Access manager 108 may analyze memory address range table 130 to determine memory address range 126 permissible to be accessed by virtual machine 106*c*. Access manager 108 may use virtual machine identifier 148 ("VM3") to analyze memory address range table 130. Access manager 108 may determine that virtual machine 106*c* has a memory address range 126 that begins at memory address start "XXY" and ends at memory address end "YYY." In the example, request 141 may be a request to access memory within the permissible range. Access manager 108 may send an indicator of memory address range 126 for virtual machine 106*c* to memory access manager 220. Access manager 108 may send processed request 143, including activation signal 144, virtual machine identifier 148 and program identifier 158, to instruction handler 124.

Instruction handler 124 may receive activation signal 144, virtual machine identifier 148 and program identifier 156. In an example, virtual machine identifier 148 may be "VM3" and program identifier may be "4." Instruction handler 124 may then analyze program affinity table 114 for stored virtual identifier 148 and program identifier 156 to find matching values. In the example, instruction handler 124 may, based on the analysis, determine that a starting address 150 should be "DDD."

In another example, virtual machine identifier 148 may be "VM3" and program identifier may be "2." Instruction handler 124 may then analyze program affinity table 114. In the example, instruction handler 124 may, based on the analysis, determine that a starting address 150 should be "BBB."

Instruction handler 124 may then configure programmable circuit 112 using the program stored starting at "BBB" to perform one or more operations on data stored in memory 118. Memory access manager 220 may receive an indicator of memory address range 126.

Continuing with the example, programmable circuit 112 may attempt to perform one or more operations on data stored at a first and a second address of memory 118. Programmable circuit 112 may send the first and the second memory address requests 160 to memory access manager 220. Memory access manager 220 may allow programmable circuit 112 to perform the one or more operations on data stored at the first address of memory 118, in examples when the first address of memory 118 is within permissible memory address range 126. Conversely, memory access manager 220 may restrict programmable circuit 112 from performing the one or more operations on data stored at the second address of memory 118, in examples when the second address of memory 118 is outside of permissible memory address range 126.

Among other possible benefits, a system in accordance with the disclosure may provide accelerated access to memory in a memory unit. The system may minimize a number of data transfers between a processor space and the memory unit. For example, a programmable circuit may be configured to perform one or more logical or other operations on the memory in the memory unit (such as incrementing or decrementing a pointer address). The decreased number of data transfers may have the effect of increasing memory access speed while decreasing the demand on the processor space (resulting in a reduction in power consumed). In an example, a virtual machine may activate and switch between one or more programs that may be stored within the memory of the memory unit.

A virtual machine may be restricted from accessing memory addresses allocated for other virtual machines even when the programmable circuit is performing operations on the memory. Such restriction may enhance security by limiting memory addresses that are accessible by a virtual machine even in examples where memory access requests are not trapped by an access manager. Additionally, a system in accordance with the disclosure may allow for faster switching between different programs and different virtual machines used by the programmable circuit.

Figure 6:
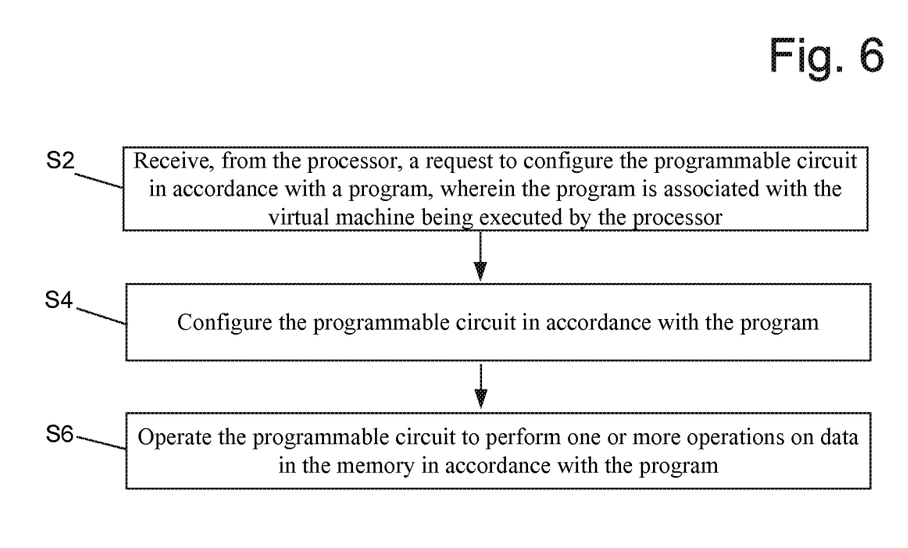
FIG. 6 depicts a flow diagram for an example process to implement acceleration of memory access.

FIG. 6 depicts a flow diagram for example processes to implement acceleration of memory access arranged in accordance with at least some embodiments described herein. In some examples, the process in FIG. 6 could be implemented using system 100 discussed above and could be used to accelerate memory access. An example process may include one or more operations, actions, or functions as illustrated by one or more of blocks S2, S4, and/or S6. Although illustrated as discrete blocks, various blocks may be divided into additional blocks, combined into fewer blocks, or eliminated, depending on the desired implementation. The process in FIG. 6 may be used by a memory that includes a memory unit and a programmable circuit. The memory unit may be configured in communication with a virtual machine executed by a processor.

Processing may begin at block S2, "Receive, from the processor, a request to configure the programmable circuit in accordance with a program, wherein the program is associated with the virtual machine being executed by the processor." At block S2, the memory unit may receive a request to configure a programmable circuit in accordance with a program. The program may be associated with the virtual machine being executed by the processor. In an example, the request may include a program that includes one or more instructions to configure the programmable circuit. The program may be stored in the memory unit. In another example, receiving the request may include receiving an indicator of one or more memory addresses or address ranges permissible to be accessed by the programmable circuit. Based on the received indicator, the memory unit may determine that a memory address is not permissible to be accessed by the programmable circuit and access to the memory address by the programmable circuit may be restricted.

In a further example, the request may include a program identifier. The program identifier may identify a program from among other available programs associated with one or more virtual machines. The program for configuring the programmable circuit may be identified based on the program identifier. In another example, a determination may be made, such as by a processor, that one or more memory addresses is not permissible to be accessed by the programmable circuit based on virtual machine identification information.

Processing may continue from block S2 to block S4, "Configure the programmable circuit in accordance with the program." At block S4, the programmable circuit may be configured in accordance with the program.

Processing may continue from block S4 to block S6, "Operate the programmable circuit to perform one or more operations on data in the memory." At block S6, the programmable circuit may be operated to perform one or more operations on data in the memory. In an example, operating the programmable circuit may include accessing a memory address of the memory to retrieve a first data value. Operating the programmable circuit may further include performing an operation on the first data value to determine a second data value, and sending a response to the processor, wherein the response includes the second data value.

Figure 7:
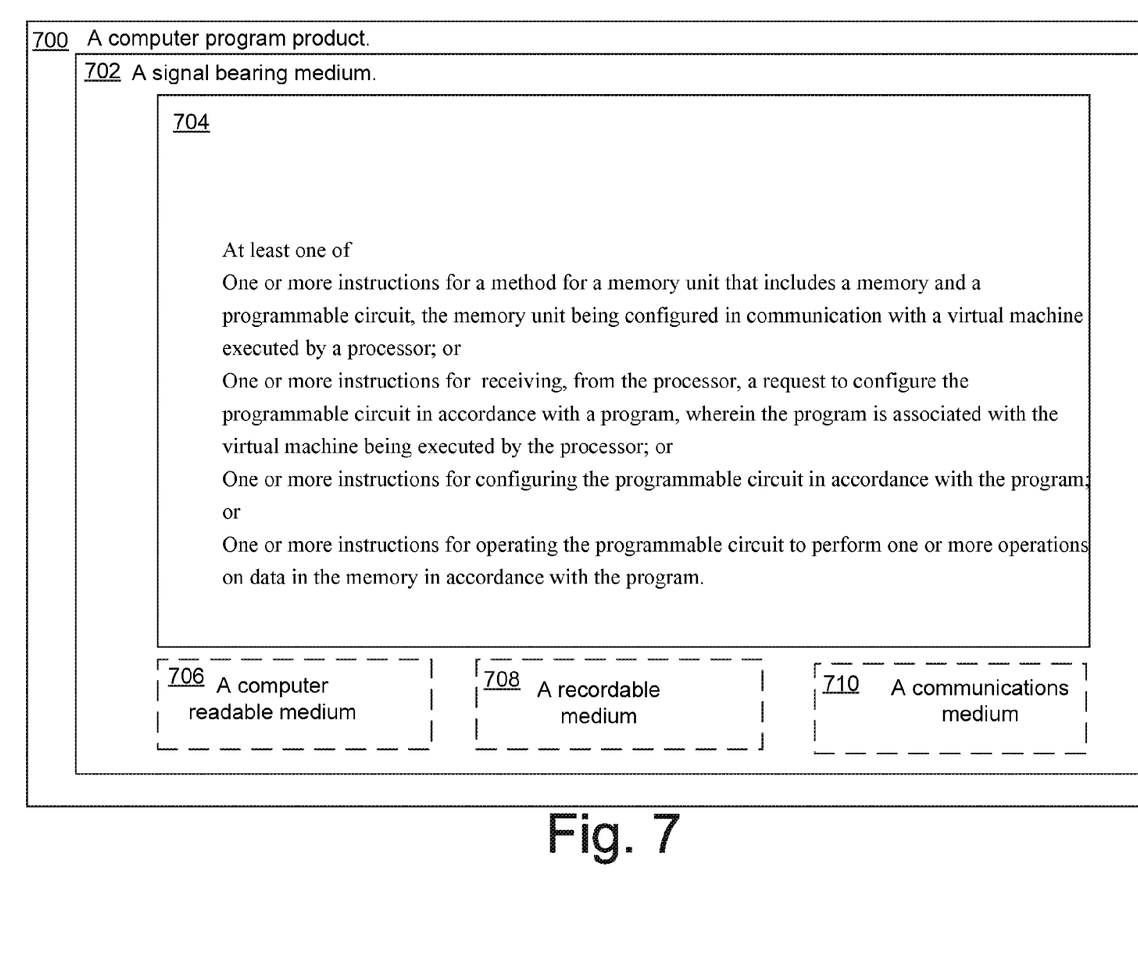
FIG. 7 illustrates an example computer program product that can be utilized to implement acceleration of memory access.

FIG. 7 illustrates an example computer program product 700 that can be utilized to implement acceleration of memory access arranged in accordance with at least some embodiments described herein. Computer program product 700 may include a signal bearing medium 702. Signal bearing medium 702 may include one or more instructions 704 that, when executed by, for example, a processor, may provide the functionality described above with respect to FIGS. 1-6. Thus, for example, referring to system 100, instruction handler 124 may undertake one or more of the blocks shown in FIG. 7 in response to instructions 704 conveyed to the system 100 by signal bearing medium 702.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 702, where the signal bearing medium 702 is conveyed by a wireless communications medium 710 (e.g., a wireless communications medium conforming with the IEEE 802.11 standard).

Figure 8:
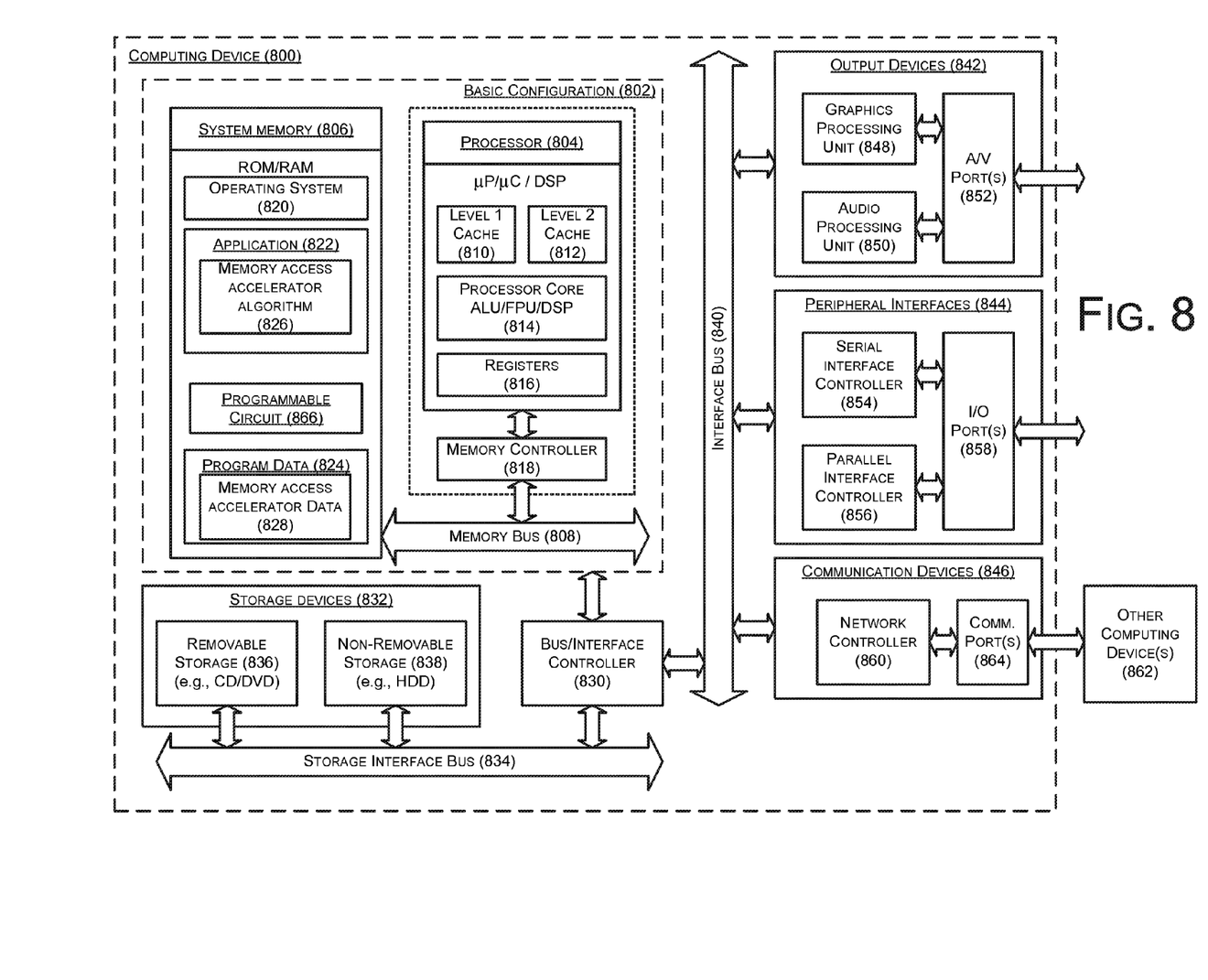
FIG. 8 is a block diagram illustrating an example computing device that is arranged to implement acceleration of memory access.

FIG. 8 is a block diagram illustrating an example computing device 800 that is arranged to implement acceleration of memory access arranged in accordance with at least some embodiments described herein. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, one or more programmable circuits 866 and program data 824. Application 822 may include a memory access accelerator algorithm 826 that is arranged to perform the functions as described herein including those described with respect to system 100 of FIGS. 1-7. Program data 824 may include memory access accelerator data 828 that may be useful to implement memory access acceleration as is described herein. In some embodiments, application 822 may be arranged to operate with program data 824 on operating system 820 such that memory access acceleration may be provided. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for a memory unit that includes a memory and a programmable circuit, the memory unit being configured in communication with a virtual machine executed by a processor, the method for the memory unit comprising:
receiving, from the virtual machine being executed by the processor, a request at the memory unit, wherein:
the request includes a request to access the memory in the memory unit,
the request specifies a program,
the program includes one or more instructions to configure circuitry of the programmable circuit to perform one or more operations on data stored in the memory included in the memory unit,
the programmable circuit includes a circuit configurable in accordance with one or more programs,
the one or more programs include the program, and the program is associated with the virtual machine being executed by the processor;

in response to receiving the request, configuring the circuitry of the programmable circuit, in accordance with the program, to perform the one or more operations on the data stored in the memory included in the memory unit, wherein the programmable circuit includes one or more of a field-programmable logic array (FPGA), a semi-programmable application-specific integrated circuit (ASIC), or a digital signal processor; and operating the programmable circuit to perform the one or more operations on the data stored in the memory in accordance with the program.

2. The method of claim 1, wherein operating the programmable circuit comprises:

accessing a memory address of the memory to retrieve a first data value;

performing an operation on the first data value to determine a second data value; and sending a response to the processor, wherein the response includes the second data value.

3. The method of claim 1, wherein receiving the request comprises:

receiving the program that includes the one or more instructions to configure the circuitry of the programmable circuit.

4. The method of claim 3, further comprising:
storing the program in the memory unit.

5. The method of claim 1, wherein receiving the request comprises:

receiving an indicator of one or more memory addresses permissible to be accessed by the programmable circuit.

6. The method of claim 5, further comprising:

based on the received indicator, determining that a memory address is not permissible to be accessed by the programmable circuit; and restricting access to the memory address by the programmable circuit.

7. The method of claim 6, wherein receiving the indicator of one or more memory addresses permissible to be accessed by the programmable circuit comprises:

receiving one or more ranges of memory addresses permissible to be accessed by the programmable circuit.

8. The method of claim 1, wherein receiving the request comprises:

receiving a virtual machine identifier, wherein the virtual machine identifier corresponds to the virtual machine being executed by the processor; and based at least, in part, on the virtual machine identifier, identifying the program.

9. The method of claim 8, further comprising:

based on the virtual machine identifier, determining one or more memory addresses that are not permissible to be accessed by the programmable circuit; and restricting access to the one or more memory addresses by the programmable circuit.

10. The method of claim 1, wherein receiving the request includes receiving a program identifier that identifies the program.

11. The method of claim 1, wherein receiving the request includes receiving a program identifier configured to identify the program upon analysis of a lookup table.

12. A memory unit, comprising:
a memory;
a programmable circuit that is a circuit configurable in accordance with one or more programs; and an instruction handler configured to be in communication with the programmable circuit, wherein the instruction handler is configured to:

receive, from a virtual machine being executed by a processor, a request to access the memory in the memory unit, wherein:

the request specifies a program among the one or more programs, the program includes one or more instructions to configure circuitry of the programmable circuit to perform one or more operations on data stored in the memory, and the program is associated with the virtual machine being executed by the processor; and in response to the receipt of the request, configure the circuitry of the programmable circuit, in accordance with the program, to perform the one or more operations on the data stored in the memory, wherein the programmable circuit includes one or more of a field-programmable logic array (FPGA), a semi-programmable application-specific integrated circuit (ASIC), or a digital signal processor, and wherein the programmable circuit is effective to:

perform the one or more operations on the data stored in the memory in accordance with the program.

13. The memory unit of claim 12, wherein the programmable circuit is further effective to:

access a memory address of the memory to retrieve a first data value;

perform an operation on the first data value to determine a second data value; and send a response to the processor, wherein the response includes the second data value.

14. The memory unit of claim 12, wherein the instruction handler is further configured to:

store the program in the memory of the memory unit.

15. The memory unit of claim 12, wherein the request includes an indicator of one or more memory addresses permissible to be accessed by the programmable circuit.

16. The memory unit of claim 15, further comprising a memory access manager configured to be in communication with the memory and the programmable circuit, wherein the memory access manager is configured to:

determine that a memory address is not permissible to be accessed by the programmable circuit based on the indicator; and restrict access to the memory address for the programmable circuit.

17. The memory unit of claim 12, further comprising a memory access manager configured to be in communication with the memory and the programmable circuit, wherein the memory access manager is configured to:

receive a range of memory addresses permissible to be accessed by the programmable circuit.

18. The memory unit of claim 12, wherein the instruction handler is further configured to:

receive a program identifier, wherein the program identifier identifies the program from among other available programs associated with one or more virtual machines; and identify the program based on the program identifier.

19. The memory unit of claim 12, further comprising a memory access manager configured to be in communication with the memory and the programmable circuit, wherein the memory access manager is configured to:

determine that one or more memory addresses are not permissible to be accessed by the programmable circuit based on a virtual machine identifier; and restrict access by the programmable circuit to the one or more memory addresses.

20. A method for a memory unit that includes a memory and a programmable circuit, the memory unit being configured in communication with two or more virtual machines executable by a processor, the method for the memory unit comprising:

receiving, from a first virtual machine executed by the processor, a first request at the memory unit, wherein:
the first request is to access the memory in the memory unit,
the first request specifies a first program,
the first program includes a first instruction to configure circuitry of the programmable circuit to perform a first set of one or more operations on data stored in the memory included in the memory unit,
the programmable circuit includes a circuit configurable in accordance with one or more programs,
the one or more programs include the first program, and
the first program is associated with the first virtual machine;

in response to receiving the first request, configuring the circuitry of the programmable circuit, in accordance with the first program, to perform the first set of one or more operations on the data stored in the memory included in the memory unit, wherein the programmable circuit includes one or more of a field-programmable logic array (FPGA), a semi-programmable application-specific integrated circuit (ASIC), or a digital signal processor;

operating the programmable circuit to perform the first set of one or more operations on the data stored in the memory in accordance with the first program;

receiving, from a second virtual machine executed by the processor, a second request at the memory unit, wherein:
the second request specifies a second program,
the second program includes a second instruction to configure the circuitry of the programmable circuit to perform a second set of one or more operations on the data stored in the memory included in the memory unit,
the one or more programs include the second program, and
the second program is associated with the second virtual machine;

configuring the circuitry of the programmable circuit, in accordance with the second program, to perform the second set of one or more operations on the data stored in the memory included in the memory unit; and operating the programmable circuit to perform the second set of one or more operations on the data stored in the memory in accordance with the second program.

21. The method of claim 20, wherein the first and second requests comprise:
first and second activation instructions effective to activate the first and second programs;
virtual machine identifiers, wherein the virtual machine identifiers identify the respective virtual machine that generated the request; and
a program identifier, wherein the program identifier identifies a respective program from among available programs associated with the virtual machine that generated the request.

22. A computer program product, comprising computer-readable instructions stored in non-transitory computer-readable media, the computer-readable instructions, operable in response to execution by a processor, to:

detect, from the processor, a request to access a memory in a memory unit, wherein:
the request specifies a program,
the program includes one or more instructions to configure circuitry of a programmable circuit of the memory unit to perform one or more operations on data stored in the memory in the memory unit,
the programmable circuit includes a circuit configurable in accordance with one or more programs,
the programmable circuit includes one or more of a field-programmable logic array (FPGA), a semi-programmable application-specific integrated circuit (ASIC), or a digital signal processor,
the one or more programs include the program, and
the program is associated with a virtual machine being executed by the processor;

in response to the detection of the request, configure the circuitry of the programmable circuit, in accordance with the program, to perform the one or more operations on the data stored in the memory in the memory unit; and operate the programmable circuit to perform the one or more operations on the data stored in the memory in accordance with the program.

23. The computer program product of claim 22, wherein the computer-readable instructions are further operable to:
access a memory address of the memory to retrieve a first data value;
perform an operation on the first data value to determine a second data value; and
send a response to the processor, wherein the response includes the second data value.

24. The computer program product of claim 22, wherein to detect the request, the computer-readable instructions are operable to:
identify an indicator of one or more memory addresses permissible to be accessed by the programmable circuit.

25. The computer program product of claim 24, wherein the computer readable instructions are further operable to:
based on the identified indicator, determine that a memory address is not permissible to be accessed by the programmable circuit; and
restrict access to the memory address by the programmable circuit.

26. The computer program product of claim 24, wherein to identify the indicator of the one or more memory addresses permissible to be accessed by the programmable circuit, the computer-readable instructions are operable to:
identify one or more ranges of memory addresses permissible to be accessed by the programmable circuit.

27. The computer program product of claim 22, wherein to detect the request, the computer-readable instructions are operable to:
detect a virtual machine identifier, wherein the virtual machine identifier corresponds to the virtual machine being executed by the processor; and
based at least, in part, on the virtual machine identifier, identify the program.

* * * * *